United States Patent
Birrell et al.

(10) Patent No.: US 7,529,834 B1
(45) Date of Patent: May 5, 2009

(54) METHOD AND SYSTEM FOR COOPERATIVELY BACKING UP DATA ON COMPUTERS IN A NETWORK

(75) Inventors: Andrew David Birrell, Los Altos, CA (US); Mark David Lillibridge, Mountain View, CA (US); Michael Burrows, Palo Alto, CA (US); Michael Acheson Isard, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1101 days.

(21) Appl. No.: 09/668,643

(22) Filed: Sep. 22, 2000

Related U.S. Application Data

(60) Provisional application No. 60/209,174, filed on Jun. 2, 2000.

(51) Int. Cl.
*G06F 15/173* (2006.01)
*G06F 15/16* (2006.01)
*G06F 11/00* (2006.01)

(52) U.S. Cl. .............. 709/226; 709/227; 709/228; 709/229; 709/244; 707/204; 707/E17.007; 707/100; 711/162; 714/6

(58) Field of Classification Search ......... 709/219–203, 709/211, 205, 223, 226–229, 244, 201; 707/200, 707/204, 100, E17.007; 705/1, 7, 8; 715/533; 726/7; 711/162; 714/6
See application file for complete search history.

(56) References Cited

U.S. PATENT DOCUMENTS 4,631,664 A * 12/1986 Bachman .............. 707/100

(Continued)

OTHER PUBLICATIONS

James S. Plank, "A Tutorial on Reed-Solomon Coding for Fault-Tolerance in RAID-like Systems", Sep. 9, 1997, Software—Practice and Experience (SPE), vol. 27, No. 9, pp. 995-1012.

(Continued)

*Primary Examiner*—Alina N. Boutah

(57) ABSTRACT

A method for backing up data in a plurality of computers connected via a network. The method includes forming partnerships between the plurality of computers such that each computer in a partnership commits under agreements to help backup the data of its partners. The method further includes periodically verifying that previously backed up data is being retained by the computers committed to act as backup partners in accordance with the agreements. In another embodiment, the method provides a distributed cooperative backing up of data in a system that includes a loose confederation of computers connected via a network. In this embodiment the method includes selecting computers as potential backup partners from among the loose confederation of computers connected via the network based on predetermined criteria, and negotiating a reciprocal backup partnership agreement between the computers based on predetermined requirements, including backup requirements. Once the negotiations are complete and the agreements are made, the method proceeds to form partnerships between the computers. The computers become backup partners by agreeing to cooperatively provide backup services to each other so that a distributed cooperative backing up of data can be administered in the absence of central control. The method further includes periodically backing up data at the backup partners, where the data being backed up is encoded. The method also includes periodically verifying that previously backed up data is retained by the backup partners. Another aspect of the invention is a distributed cooperative backup system that includes a network and a loose confederation of computers connected via the network. A plurality of computers from among the loose confederation of computers is configured for distributed cooperative backing up of data and for functioning as backup partners. Each computer of the plurality of computers has a storage that can be used for providing reciprocal backup services. Each computer of the plurality of computers respectively also has a computer readable medium embodying computer program code configured to cause the computer to perform functions comparable to the method steps as described above.

34 Claims, 7 Drawing Sheets

Distributed, Cooperative Backup System

U.S. PATENT DOCUMENTS

| | | | | |
|---|---|---|---|---|
| 5,737,763 | A * | 4/1998 | Hilditch | 711/162 |
| 5,771,354 | A * | 6/1998 | Crawford | 709/229 |
| 5,852,713 | A * | 12/1998 | Shannon | 714/6 |
| 5,862,325 | A * | 1/1999 | Reed et al. | 709/201 |
| 6,065,062 | A * | 5/2000 | Periasamy et al. | 709/242 |
| 6,073,250 | A | 6/2000 | Luby et al. | 714/6 |
| 6,076,148 | A * | 6/2000 | Kedem | 711/162 |
| 6,081,909 | A | 6/2000 | Luby et al. | 714/701 |
| 6,081,918 | A | 6/2000 | Spielman | 714/746 |
| 6,122,630 | A * | 9/2000 | Strickler et al. | 707/8 |
| 6,148,383 | A * | 11/2000 | Micka et al. | 711/162 |
| 6,189,045 | B1 * | 2/2001 | O'Shea et al. | 709/246 |
| 6,226,759 | B1 * | 5/2001 | Miller et al. | 714/6 |
| 6,252,884 | B1 * | 6/2001 | Hunter | 370/443 |
| 6,295,513 | B1 * | 9/2001 | Thackston | 703/1 |
| 6,304,892 | B1 * | 10/2001 | Bhoj et al. | 709/202 |
| 6,304,980 | B1 * | 10/2001 | Beardsley et al. | 714/6 |
| 6,408,399 | B1 * | 6/2002 | Baughman | 714/4 |
| 6,460,122 | B1 * | 10/2002 | Otterness et al. | 711/154 |
| 6,513,106 | B1 * | 1/2003 | Lau et al. | 711/221 |
| 6,530,035 | B1 * | 3/2003 | Bridge | 714/6 |
| 6,560,617 | B1 * | 5/2003 | Winger et al. | 707/204 |
| 6,574,709 | B1 * | 6/2003 | Skazinski et al. | 711/119 |
| 6,574,733 | B1 * | 6/2003 | Langford | 713/194 |
| 6,601,187 | B1 * | 7/2003 | Sicola et al. | 714/6 |
| 6,704,884 | B1 * | 3/2004 | Shepherd et al. | 714/4 |
| 6,766,372 | B1 * | 7/2004 | Stern | 709/227 |
| 6,847,984 | B1 * | 1/2005 | Midgley et al. | 707/204 |
| 7,328,366 | B2 * | 2/2008 | Michelman | 714/6 |
| 2002/0007453 | A1 * | 1/2002 | Nemovicher | 713/155 |
| 2002/0049778 | A1 * | 4/2002 | Bell et al. | 707/200 |
| 2002/0095454 | A1 * | 7/2002 | Reed et al. | 709/201 |
| 2002/0107877 | A1 * | 8/2002 | Whiting et al. | 707/204 |
| 2004/0073677 | A1 * | 4/2004 | Honma et al. | 709/226 |
| 2004/0153458 | A1 * | 8/2004 | Noble et al. | 707/10 |

OTHER PUBLICATIONS

Luby et al., "Efficient Erasure Codes", 1999, IEEE Transactions on Information Theory, http://cm.bell-labs.com/who/amin/publication/LDPC/loss-res.ps (see also U.S. Patent No. 6,073,250).

Tonda Benes, "The Eternity Service", Nov. 13, 1998, http://www.kolej.mff.cuni.cz/~eternity/.

Chen et al., "A Prototype Implementation of Archival Intermemory", http://www.intermemory.org/.

Luby et al., "Irregular Codes for Forward Error Correction", Dec. 7, 1999, www.research.digital.com/SRC/Articles.

Luby et al., "Practical Loss-Resilient Codes", 1997, www.research.digital.com/SRC/Video/Loss Resilient Codes.

Malluhi et al., "Coding for High Availability of a Distributed-Parallel Storage System," IEEE Transactions on Parallel and Distributed Systems, Dec. 1998, pp. 1237-1252, vol. 9, No. 12, IEEE Computer Society, Los Alamitos, CA.

C. K. Nemovicher, U.S. Appl. No. 60/206,580, filed May 23, 2000.

* cited by examiner

10

Distributed, Cooperative Backup System

Backup Operations of the Cooperative Backup System at Each Computer System

208
Generate Encoded Data and Distribute to Backup Partners

212
Restore Data from Backup Partners

METHOD AND SYSTEM FOR COOPERATIVELY BACKING UP DATA ON COMPUTERS IN A NETWORK

REFERNCE TO FIRST APPLICATION

This application claims the benefit of U.S. Provisional Application No. 60/209,174, entitled "Method And System For Cooperatively Backing Up Data On Computers In A Network," filed Jun. 2, 2000.

BACKGROUND OF THE INVENTION

1. Field of the Invention

This application relates to data archiving and, specifically, to backing up data in the context of a plurality of computers connected via a network.

2. Background Art

Safeguarding a computer file system prevents irrevocable loss of data stored in the file system. Creating backup copies of the file system data is essential for ensuring resiliency of the data. Traditionally, backup involves creating a copy of the data and storing the backup copy safely. Namely, traditional backup creates one or a few backup copies, stores them on a storage medium, and deposits the storage media at a safe, preferably distant, place. To recover lost data, the storage medium is located and the data is retrieved therefrom. This approach requires manual handling of the backup copies or a more sophisticated automated handling. Manual handling is slow and vulnerable to errors and it requires human diligence and discipline. Automated handling can overcome some of the manual handling shortcomings but it can be expensive and difficult to implement. In either case, considerable administrative and capital expense is needed for setting up a backup system. Backup administration involves, for example, scheduling and monitoring backup operations, mounting and dismounting backup media, and maintaining backup media on and off site. Capital expenses are incurred in purchasing of backup media such as tape drives and disk arrays and in acquisition of storage space for the backup media. Advances in technology have made it possible to store and retrieve more data and to access it more quickly. Networking via the Ethernet and Internet, file transfer protocols (ftp) and bulletin board systems (bbs) characterize such advances. Several schemes can be pointed out to illustrate the development of data storage and retrieval.

One scheme is a distributed storage and retrieval system proposed in a Doctoral Thesis entitled "The Eternity Service," by Tonda Beneš of the Department of Software Engineering, Faculty of Mathematics and Physics, Charles University Prague, dated Nov. 13, 1998, and available at http://www.kolej.mff.cuni.cz/~eternity/. The stated goal of this storage and retrieval system, which is known as the Eternity Service (hereafter "service"), is to increase availability and resiliency of the data. To achieve this goal, an arbitrary number of data copies are randomly distributed via the Internet to servers across the world. The system does not keep a record of this distribution and maintains no information on the identity of the data owner (i.e., user or user's computer identity). Instead, along with the data, each server stores a list of key words associated with the data. In case a user wants to access the data,, the data can be retrieved from any server that stores it using the key words as a search criteria. For security, the data owner can encrypt the data before it is stored so as to render its retrieval useless to unintended users. The servers can run under various operating system platforms and are expected to be resilient to potential attacks (e.g., viruses etc.).

For further reliability, data integrity verification can be implemented using, for example, a digital signature to sign the data. The data owner and any of the servers enter into an agreement for a pre-paid duration of data storage, after which the data is discarded. Proof of data retention is required before payment is made. The idea of storage-for-pay may be suitable for some users such as large commercial entities, but it may not be suitable for other users.

Another data storage and retrieval approach is proposed by M. Quataibah et al. in an article entitled "Coding for High Availability of a Distributed-Parallel Storage System," available on pages 1237-1252 of Vol. 9, No. 12, of IEEE Transactions of Parallel and Distributed System publication, December 1998. The functional design strategy for the proposed distributed parallel storage system is to provide a high-speed block server that is distributed across a wide area network and used to supply data to applications located anywhere in the network. With this approach, the distributed parallel storage system employs the aggregate bandwidth of multiple data servers connected by high-speed wide-area network to achieve scalability and high data throughput. One such storage system can be distributed across several geographically distant sites connected via a high-speed network that uses a transport protocol such as IP (internet protocol) over ATM (asynchronous transfer mode). The distributed parallel storage system provides an architecture for caching large amounts of data that can be used by many different users and processes. To enhance the reliability and availability of such network-based distributed storage system, an error-correction code scheme is used to reconstruct missing information. This scheme protects the system against data loss by adding redundancy to the original data. The basic idea of the scheme is to fragment a stored object (e.g., file) into blocks and distribute the blocks across available servers divided among servers that hold original data and servers that hold redundant data. If the total number of failed servers is less than the number of servers holding the redundant data, the actual data can be restored. However, the way these blocks are distributed over the different servers is left open. It is the responsibility of the application to choose a proper data layout to maximize parallelism.

Yet another data storage and retrieval approach is provided by the Intermemory Initiative as described at http://intermemory.org/ and as is further described by Y. Chen et al. in a technical paper entitled "A Prototype Implementation Of Archival Intermemory," published in ACM Digital Libraries, August 1999, available via http://Intermemory.org/papers/improto/main.html. The prime design initiative for the archival intermemory aims to develop a large-scale and secure widely-distributed storage that can later become an important component of digital libraries. Inspired by the growth of Internet, and using distributed algorithms and protocols, this design targets self organization, self maintenance and effective administration in the absence of central control. Architecturally, the storage system is made up of numerous widely distributed processors (computer systems) that are individually unreliable and untrustworthy but with the overall system nevertheless secure. The processors cooperate over the internet to create a data storage space that preserves the data despite destruction of nearly half the processors, disconnection of the network in multiple geographic regions, or presence of malicious attacks on data stored in the processors. The design builds on erasure-codes for information dispersal, digital signatures, one-way functions, byzantine agreements and the like. The system further builds on a synchronization mechanism where information is automatically dispersed throughout the network and where damaged or lost data is automatically replaced through a subscriber's interactions with each of its 32 neighbors in the system, i.e., automated refreshing. As with the previously described system the issues of who gets to store how much data and how the participating server owners are to be paid are not addressed.

Accordingly, what is needed is a free-of-charge simpler but effective and safe administration of distributed storage of backups in the absence of central control. The present invention addresses this and related issues.

SUMMARY OF THE INVENTION

The present invention provides a distributed cooperative backup system and the method of implementing and operating the same. In accordance with the present invention, a plurality of computer systems cooperate over the network to create a distributed storage space and to provide backup services for each other using the distributed storage space. Notably, the cooperative aspect of the distributed backup is realized by forming over the network backup partnerships among pairs of computer systems in the network where backup partners agree to help backup each other's data. What is more, the present invention targets self-maintenance and effective administration of the backup operations in the absence of central control with the goal of freeing the system from user intervention or any type of system administration. Finally, by automating everything about the backup procedure except installing backup software and performing initial configuration, the present invention advantageously removes substantial obstacles that prevent computer users from otherwise regularly backing up their files.

Hence, in accordance with the purpose of the invention, as embodied and broadly described herein, the invention relates to a method for a distributed cooperative backing up of data in a system that includes a loose confederation of computers connected via a network. The method includes selecting computers as potential backup partners from among the loose confederation of computers connected via the network based on predetermined criteria, and negotiating reciprocal backup partnership agreements between the computers based on predetermined requirements, including backup requirements. Once the negotiations are complete and the agreements are made, the method proceeds to forming partnerships between the computers. The computers become backup partners by agreeing to cooperatively provide backup services to each other so that a distributed cooperative backing up of data can be administered in the absence of central control. It is noted that there are multiple reciprocal partnership agreements among groups of computers, rather than just one. Suppose for example that computers B and C are backup partners of computer A. Then, computer A is a backup partner of computer B and computer C based on the respective reciprocal agreements with computers B and C. The method further includes periodically backing up data at the backup partners, where the data being backed up is encoded, and periodically verifying that previously backed up data is retained by the backup partners.

In further accordance with the purpose of the invention as embodied and broadly described herein, the invention relates to a distributed cooperative backup system that includes a network and a loose confederation of computers connected via the network. A plurality of computers from among the loose confederation of computers is configured for distributed cooperative backing up of data and functioning as backup partners. Each computer of the plurality of computers has a storage that can be used for providing reciprocal backup services, and each computer of the plurality of computers respectively has a computer readable medium embodying computer program code configured to cause the computer to perform functions comparable to the method steps as described above.

Various modifications to the preferred embodiment will be apparent to those skilled in the art from consideration of the disclosure and practice of the invention disclosed herein and the generic principles herein may be applied to other embodiments. Thus, the present invention is not intended to be limited to the embodiments shown, but is to be accorded the widest scope consistent with principles and features described herein.

Advantages of the invention will be understood by those skilled in the art, in part, from the description that follows. Advantages of the invention will be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

The present invention relates to data archiving and, specifically, to backing up data in the context of a plurality of computers connected via a network. As a functional and architectural strategy, the invention contemplates a distributed cooperative backup system made up of a plurality of, preferably widely distributed, computers that may be individually unreliable and untrustworthy but with the overall system being nevertheless reliable and secure. The plurality of computers cooperate over the network to create the distributed storage space that preserves the data. The cooperative aspect of the distributed backup system is realized by forming backup partnerships among computers in the network where backup partners agree to help backup each other's data. Notably also, the present invention targets self-maintenance and effective administration of backup operations in the absence of central control, the goal being to substantially free the backup system from user intervention or any type of system administration. By automating everything about the backup procedure except installing backup software and performing initial configuration, the present invention advantageously removes most of the obstacles that prevent computer users from regularly backing up their files.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

Figure 1:
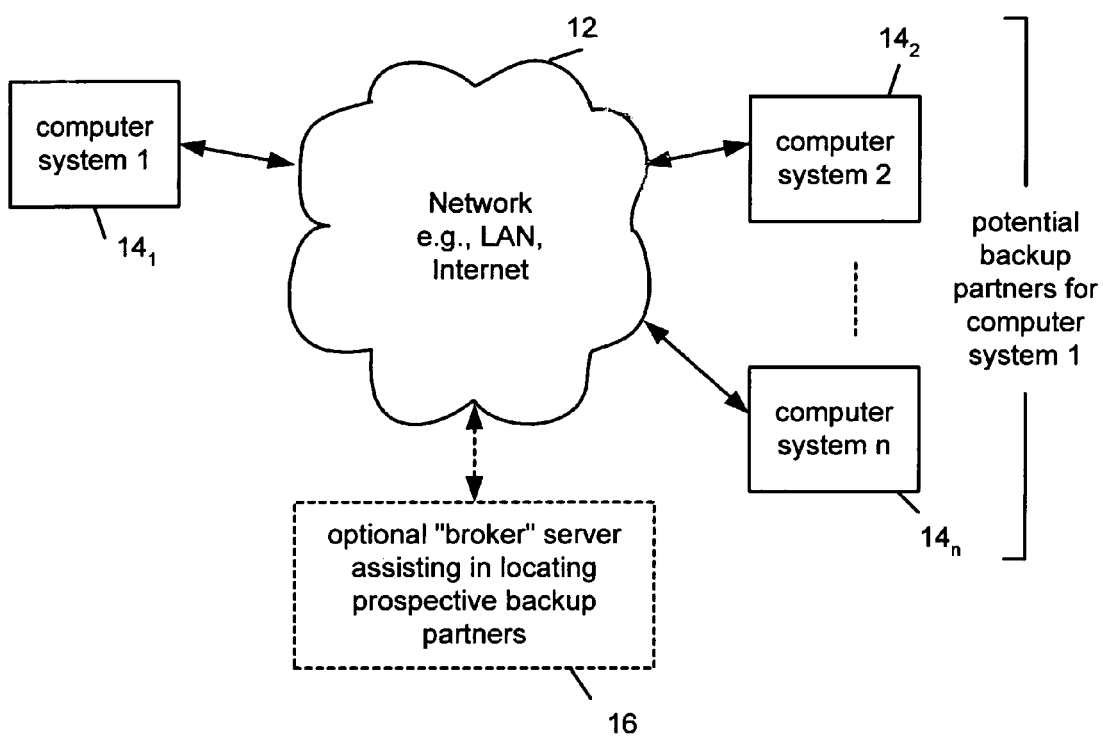
FIG. 1 shows an example of a distributed cooperative backup system.

As mentioned, the present invention operates in the context of a collection of computers connected via a network. The collection of computers may be large or small, such as the plurality of computers connected to a local area network (LAN) or to the Internet, respectively. FIG. 1 illustrates a distributed cooperative backup system as contemplated by the present invention. The computer systems $14_{1...n}$ shown in FIG. 1 represent any personal computers, workstations or the like, and are connected via network 12 such as the Internet and/or LAN. In the distributed cooperative backup system 10, pairs of computers from among the computer systems $13_{1...n}$ are expected to cooperate with each other in a backup partnership for backing up each other's data. An optional broker server 16 can assist any of the computer systems $14_{1...n}$ to locate a suitable backup partner. In this example, computer system 1 ($14_1$) contains potentially important data to be backed up. Computer systems 2, ... n ($14_{2...n}$) are potential backup partners for computer system 1 ($14_1$). In the absence of the broker server 16, computer system 1 ($14_1$) will itself select suitable backup partner(s) from among the group of computer systems 2, ... n ($14_{2...n}$).

Figure 2:
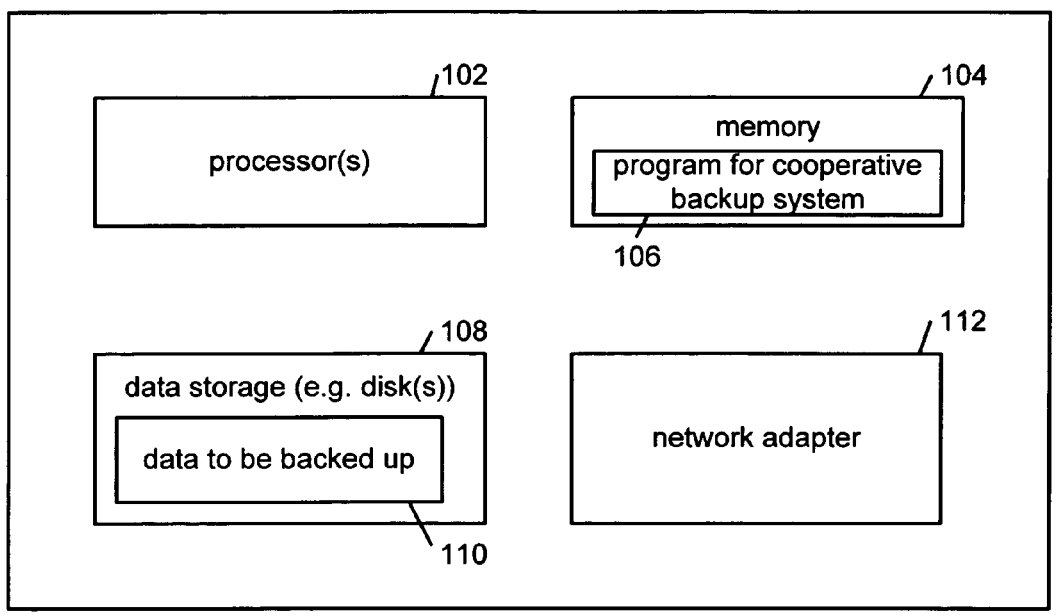
FIG. 2 illustrates the elements of a suitably configured computer system.

In order to participate in the distributed cooperative backup system, a computer system 1, ... n ($14_{1,...n}$) needs to be suitably equipped to handle the backup and backup protocols. FIG. 2 illustrates the elements of a suitably equipped computer system i ($14_i$), where i∈(1, ... n). Architecturally, the computer system ($14_i$) includes one or more processors 102, a memory 104, a data storage such as disks 108 and a network adapter 112. The memory 104 may be any computer readable medium that embodies program code of a computer program for the cooperative backup system 106. The computer program code 106 causes the computer system $14_i$, via the processor(s) 102, to partner with other computer systems for backing up each other's data. The network adapter 112 facilitates the link to other computers systems via the network.

In general, the data storage 108 of the i-th computer system ($14_i$) holds a file system including the operating system, applications, database files etc. One type of files, such as the operating system, are customarily provided by software vendors on a CD-ROM or the like. A second type of files, such as database files, hold important data that is not necessarily available from a vendor on a CD-ROM. Typically, therefore, only files of the second type need to be safeguarded through backup. A local backup copy in the data storage 108 is clearly useless if a computer system is physically destroyed.

Accordingly, the distributed cooperative backup system of the present invention targets available data storage space in each computer system to facilitate the backing up of data from other computer systems without incurring additional costs. This strategy is consonant with the two-fold increase every year in the data storage capacity. What is more, there are many computer system users in the same position who wish to have their important data backed up but who do not wish to administer or pay for the administration of the backup. Therefore, the data storage 108 of the i-th computer system ($14_i$) holds data to be backed up 110 and data that need not be backed up, and the remaining space in the data storage is targeted for backing up backup partners' data. Namely, there is reasonable probability that there is sufficient data storage space available in each of the computer systems in the network to allow backing up of data from their respective backup partners. Moreover, the data to be backed up occupies a relatively small storage space as compared to the space occupied by the entire file system. This eliminates the need for off-line storage media (e.g., disk, tape or the like). Furthermore, computer systems are typically up and on-line either always or at least during regular and predictable times (e.g. office hours). Building on this environment, the basic idea is that computer systems that function as backup partners agree to hold each other's backup data in their respective data storage (108) by exchanging the data to be backed up via the network.

In the absence of a central control, the exchange between the backup partners follows a cooperative backup protocol, as will be later explained. In essence, a first computer system assumes the task of holding backup data received via the network from a second computer system. In return, the second computer system assumes the task of holding backup data from the first computer system. Hence the term "backup partners." In this example, the first computer system helps "back up" the second computer system and is thus a backup partner of the second computer system, and vice-versa. The first and second backup partners mutually impose on each other the duty to maintain the backup data by adhering to the cooperative backup protocol. Enforcing the protocol of the cooperative backup prevents freeloading by computer systems. The goal of creating a backup is the ability to recover from the loss of a data storage or the entire computer system. In order to restore lost data, the first computer system, for example, can retrieve the backup data from its backup partners, in this case, just the second computer system.

It is noted that, in practice, the first computer system backs up more than one computer system and, in turn, more than one computer system helps back up the first computer system. Namely, each computer system that participates in the distributed cooperative backup system is expected to provide backup services to and, in turn, receives backup services from its backup partners. It is further noted that computer systems can enter and leave the cooperative backup system at any time. What is more, the administration of the distributed cooperative backup among the backup partners is achieved in the absence of central control (seeing that, optionally, a broker server as the one shown in FIG. 1 merely assists in locating prospective backup partners).

Figure 3:
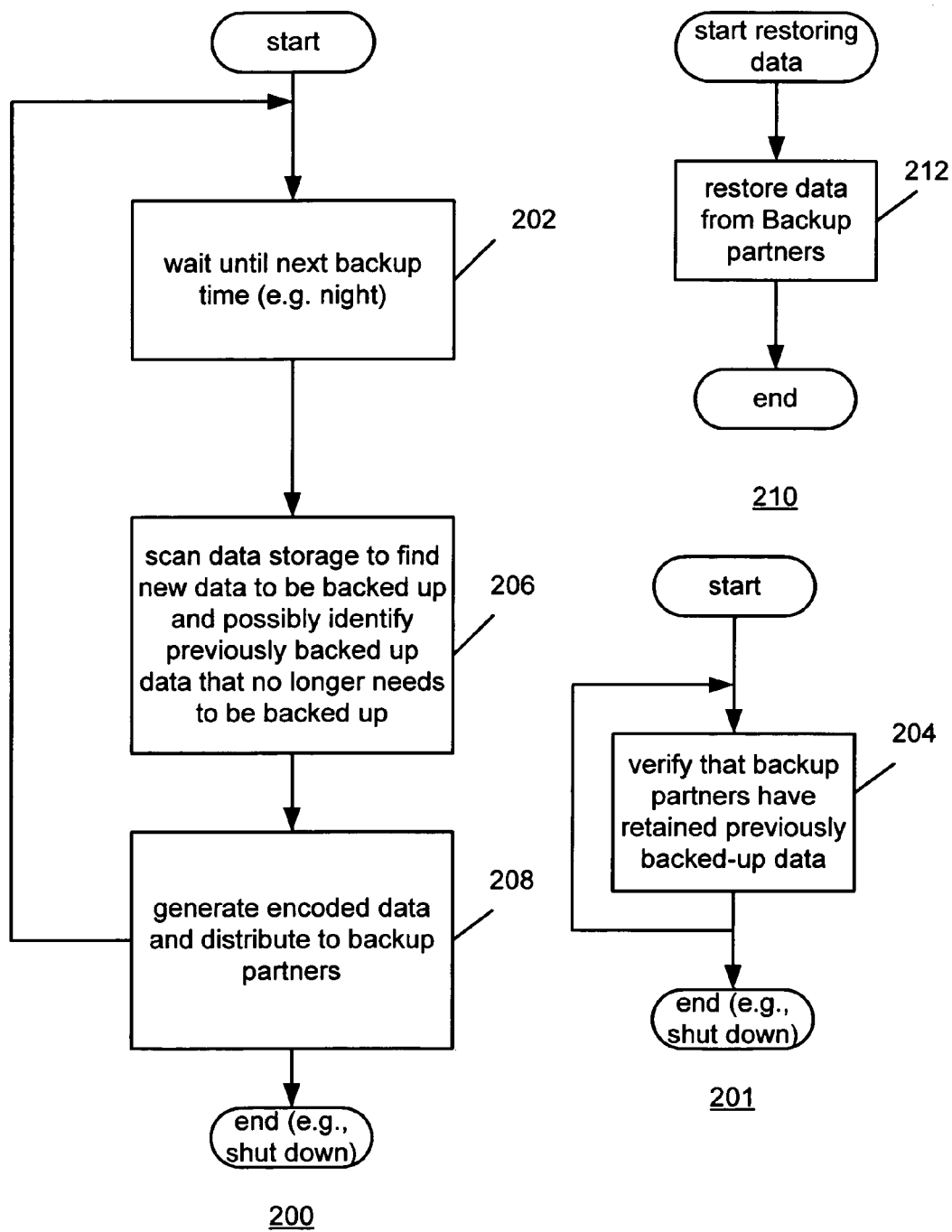
FIG. 3 is a flow diagram showing backup operations, in general, of the cooperative backup system from the standpoint of any computer system in the distributed cooperative backup system.

The aforementioned cooperative backup protocol corresponds with the backup operations as hereafter described. FIG. 3 is a flow diagram showing backup operations, in general, of the cooperative backup system from the standpoint of any computer system in the distributed cooperative backup system. Therefore, for simplicity, the discussion that follows speaks of one such computer system.

As a rule, backup of data occurs regularly in order to refresh the backed up data. Accordingly, as shown, the computer system waits until the next backup time before commencing the backup procedure (step 202). Backup can be first performed following initial system startup and periodically thereafter. Hence, the next backup time may be any time subsequent to initial start up and periodically thereafter. In the absence of central control or administration, the backup partners themselves periodically monitor each other's performance of the reciprocal agreement to hold each other's backup data. The monitoring is performed primarily in order to verify that no backup partner is free-loading, i.e., receiving backup services without providing them in return. A more detailed explanation of this verification will be later provided in conjunction with the description of FIG. 4.

To prepare data for backup, the computer system scans the data storage to find new data to be backed up and possibly identify previously backed up data that no longer needs to be backed up (step 206). Various algorithms may be used to determine the data to be backed up. As mentioned before, the data storage of the computer system holds a file system of which some files need to be backed up and others do not. It is noted that when speaking of data to be backed up it is usually meant that such data is embodied in file(s) of the file system. A typical hierarchical file system features a tree structure with any number of sub-tree structures. Nodes in the tree structure are file folders, the root node being the top-level file folder in the hierarchical file system. Since only some of the files need to be backed up, only some of the sub-trees containing such files need to be targeted for backup. Namely, only selected file folders need to be periodically backed up, either in part or in their entirety. Various schemes for specifying data to be backed up may be implemented without departing from the scope and spirit of the invention. For example, a user may specify certain sub-trees in the file system to be backed up in their entirety say once a week. Incremental backups can be used to refresh the backup data more frequently (e.g., daily). For daily backups the user may specify only files within these sub-trees that have changed. Moreover, previously backed up files for which backups are no longer needed are no longer specified for backup.

Following the designation of data to be backed up, the computer system generates encoded data from the designated data and distributes the encoded data to its backup partners, hence the term "distributed backup" (step 208). Encoding and dispersing the data among backup partners allows recovers of the data even when some of the backup partners fail or renege on their promise to hold back up data for other backup partners in their available storage space. The step of encoding and dispersing the data to be backed up will be described in more detail below in conjunction with the explanation of FIG. 6. As will be later explained, the data to be backed up is advantageously also encrypted. As is further shown in FIG. 3, the backup operations of the computer system involve also, and are primarily for, restoring lost data. The step of restoring data from backup partners (step 212) will be explained in detail in the description of FIG. 7.

Figure 4:
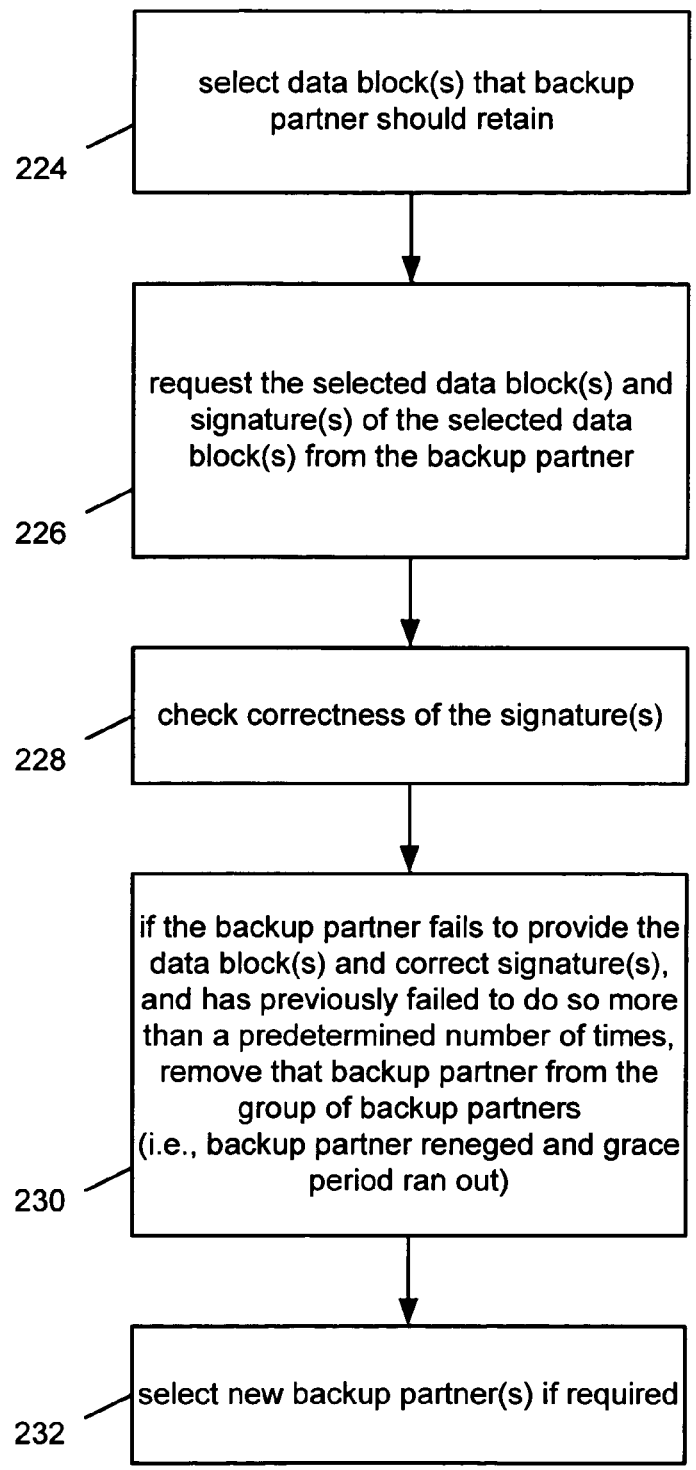
FIG. 4 is a flow diagram illustrating how the computer system verifies that its backup partners have retained its previously backed up data.

The cooperative backup operations as outlined above from the standpoint of one computer system apply similarly to other computers systems on the network that are set up with the cooperative backup software. The cooperative interaction between the collection of computer systems forms the distributed backup, where each computer receives backup services from its backup partners in return for it providing backup services to its backup partners. In order to prevent freeloading by purported backup partners, the computer system imposes the cooperative backup protocol on its backup partners. Participation in the distributed cooperative backup system builds on establishing partnerships between computer systems and on honoring the partnership (reciprocal) agreements by following the cooperative backup protocol. Hence, to verify that the agreements with its backup partners are honored, the computer system verifies periodically that its backup partners have retained previously backed up data (FIG. 3, step 204). It is noted that the verification should be sufficiently frequent to ensure that backed up data is maintained by the backup partners. FIG. 4 is a flow diagram illustrating how the computer system verifies that its backup partners have retained its previously backed up data.

Initially, as part of the backup strategy, the computer system starts with processing the actual data to be backed up. And, as nearly all files in a file system are divided into file blocks, each typically including a fixed number of consecutive data bytes, the block of actual data to be backed up is typically a file block. Assuming then that a block of actual data to be backed up is x, processing (compressing, encrypting and encoding) of the actual data block, x, converts it into D, which is the part of x that is to be stored in the designated backup partner. In actual fact, D is one of a number of blocks that, in the aggregate, embody the encoded and encrypted representation of the entire block of actual data. As will be later explained in more detail, the encoding adds redundancy to the actual data thus providing fault-tolerance, i.e., data loss resiliency. As will be further explained, the blocks produced from x, including D, are each assigned to a distinct backup partner for storage. The encryption is an effective way to achieve data security. For example, an encrypted file block requires a secret key or password to read it.

Each computer system that participates in the backup strategy may eventually need to restore lost data by retrieving blocks of previously backed up data from its backup partners. As mentioned, the blocks of backed up data are respectively distributed among backup partners for safe storage. Thus, each computer system that participates in the backup strategy periodically tests whether its backup partners have faithfully stored the data entrusted to them. To do this, each computer system follows an algorithm as shown in FIG. 4. Hence, for each of its backup partners, the computer system selects a block from among the previously backed up blocks of data purportedly retained by the backup partner (step 224). Assuming that the computer system has stored blocks $D_0$, $D_1 \ldots D_i \ldots$ on backup partner B and the selected block is $D_i$, the computer system needs to retrieve (step 226) and verify the validity of $D_i$ (step 228). Retrieval and verification of block $D_i$ allow restoration of lost data and help make certain that the backup partner faithfully retains block $D_i$.

A block can be selected randomly or in another way. The random selection of a block prevents the backup partner from having prior knowledge of the block to be evaluated and from having the opportunity to circumvent the reciprocal agreement with the computer system. However, this approach may allow the computer system to treat its backup partner as a file server and potentially overload this backup partner. Accordingly, the preferred way for selecting the block uses a protocol rather than random block selection. More particularly, the computer system and its backup partner (the one being tested) engage in a protocol to produce a random number, but neither of them controls the outcome individually. The block that corresponds to the random number is the selected block. Moreover, to read a particular block of data from its backup partner the computer system must request all the data, although its backup partner may limit the number of times it allows the computer system to retrieve all the data, say to a few times a year. This approach effectively prevents the computer system from using its backup partner as a file server, but it allows the computer system to check that the backup partner is faithfully maintaining its backup data. Thus, this approach ensures that the backup partners are not used in an improper manner but, rather, only as intended by honest participants.

The protocol for producing the random number can be implemented in various ways. Namely, there are various ways in which the computer system and its backup partner can agree on a random number. One protocol involves a cryptographically secure hash function, H0, such as MD5 (a hash function or algorithm produces a hash value from a data block). In this protocol, the computer system picks a random number, Ra, and sends to its backup partner a hash value, X, of Ra, i.e., X=H(Ra). The backup partner picks and sends to the computer system a random number, Rb. The computer system then sends Ra to the backup partner that, in turn, verifies that X=H(Ra), i.e., that X is indeed the hash value of Ra. Otherwise, this procedure is repeated as the computer system has cheated. The computer system and its backup partner then compute a random number, R, such that R=Ra XOR Rb. Next, the computer system and its backup partner preferably use R mod C, where C is the number of data blocks stored by the computer system and its backup partner. This works because neither one of the computer system and its backup partner control the final value of R. The computer system cannot control the selection of Rb and, in turn, its backup partner cannot control the selection of Ra. Moreover, the computer system does not see Rb before it selects Ra and cannot change its selection of Ra in view of Rb. In turn, its backup partner does not see Ra before it selects Rb and cannot change its selection of Rb in view of Ra. It is assumed that the computer system cannot find collision in H0.

As before, it is assumed that the computer system has stored blocks $D_0, D_1 \ldots D_1 \ldots$ on backup partner B and the selected block is $D_i$. For the above-stated reasons, the computer system needs to retrieve and verify the validity of $D_i$. To do it efficiently, the computer system can use hashing. Hashing produces a hash value from a data block using a formula (hash algorithm or function). Distinct text strings produce distinct hash values with exceedingly high probability. Hash values are generally used to verify that transmitted data is not been tampered with. For instance, a sender (i) generates a hash of a message, encrypts the hash, and sends the hash together with the message; (ii) produces another hash from the received message; and (iii) compares the two hashes to determine if they are equal and indicating that message transmitted is intact.

In this case, to verify that the retrieved block, $D_i$, is indeed a valid block the backup partner B is required to store $D'_i$ not merely $D_i$, where $D'_i = D_i$ H(S, $D_i$, B, i); H0 being a cryptographically secure hash function, S being a secret key known only to the computer system and B indicating which backup partner is to store the block. Upon additionally retrieving $D+_i$ from its backup partner, the computer system can extract $D_i$ from $D'_i$ and again compute H(S, $D_i$, B, i). The computer system can next compare the newly computed hash value with the previously computed hash value, $D'_i$. If the values match the computer system can conclude that the block, $D_i$, is valid. This works because had the backup partner changed $D_i$ it could not create a matching value in $D'_i$, not knowing S and not being able to invert H0.

Alternatively, but at present not preferably, the computer system can verify the validity of the block, $D_i$, without transmitting the block over the network. One way for verifying $D_i$'s validity without transmitting $D_i$ over the network is to use RSA cryptography. With RSA cryptography, the computer system generates two random large primes, p and q, the product of which being N; N=pq. For any $D_i$ the computer system wishes to store on a respective backup partner, the computer system computes and stores locally $d=D_i$ mod phi (N), where phi(N) is the Euler Totient function. The phi(N) can be obtained if the factorization of N is known. When the computer system intends to verify that its respective backup partner has $D_i$, the computer system invents a new random number, r, which it sends together with N to its respective backup partner. The backup partner is then required to compute $r^{Di}$ mod N, which it can only do if it has $D_i$. Meanwhile, the computer system computes $r^d$ mode N, and since d is smaller than $D_i$ this computation is faster. Because of the relationship between d and $D_i$ the results yielded by these computations should be the same. Hence, the computer system can verify that its backup partner indeed has $D_i$ without having to store $D_i$ or transmit it over the network on each verification. This approach is not preferred because it is too slow. Over time, such alternative ways to verifying $D_i$'s validity may turn out to be the chosen approach, but at present the aforementioned preferred approach is more efficient. Namely, as more efficient computations become increasingly feasible relative to the cost of higher bandwidth such alternative ways may turn to be the preferred approach. Approaching this goal is a method described in U.S. Pat. No. 5,848,159 of Collins et al. entitled "Public Key Cryptographic Apparatus and Method" which is incorporated herein by reference. The Collins approach improved upon the RSA public key encryption and decryption schemes by employing a composite number formed from three or more distinct primes to allow dividing the computation task into sub-parts that can be processed in parallel.

Whichever approach is used for verifying that backup partners retained previously backed up data, if the computer system finds that a backup partner has not done so it considers the backup partner to have reneged on its promise. However, a backup partner may have merely failed to respond to the computer system request for a block. A failure to respond may be due to no fault of the backup partner as when the backup partner is physically defective or simply off-line. Accordingly, a backup partner is considered only temporarily reneged until it is proven to have reneged over an extended period of time or for more than a predetermined number of times (step 230). Namely, the backup partner is given a failure grace period beyond which the backup partner's regression is no longer forgiven.

The fallacy of the grace period concept can be in the expectation that backup partners will not exploit it for freeloading. In reality, however, there is the possibility that a particular computer system purporting to be a backup partner is in fact intending to be a freeloader. This particular computer system can form reciprocal backup agreements with a number of computer systems and benefit from backup services under those agreements without honoring them. In particular, such purported backup partner can receive backup services while failing to respond to challenges from its backup partners for the duration of the grace period. Just before the grace period runs out, this particular computer system can form new reciprocal partnership agreements, and so on. Since grace periods can be long enough—on the order of weeks—to accommodate vacation time or the like, the particular computer may not find it too onerous to pick new backup partners each time a grace period is about to run out.

In order to address this problem, the computer system preferably uses the concepts of a commitment period. Provided that the commitment period is longer than the grace period the potential freeloader will no longer be able to use the above-mentioned strategy. Specifically, when a backup partnership agreement is made between the computer system and a chosen backup partner, each side commits to store the data in the normal way. In addition each side guarantees that restoration requests will not be made or honored for a predetermined commitment period longer than the grace period, although queries (for agreement monitoring purposes) will be responded to. This approach works for a number of reasons. In order to obtain continuous backup services, the would be freeloader must exhaust the commitment period with the subsequent group of its backup partners before the grace period runs out on the previous group of its backup partners. Such a potential freeloader must start storing data from its subsequent group of backup partners before it stops storing data from its previous group of backup partners. This will force the potential freeloader to store more data than it otherwise would if it honored the partnership agreements.

Once the grace period runs out on a backup partner the computer system informs the backup partner that it is considered to have reneged and is removed from the group of backup partners, probably to be replaced with another backup partner (step 232). The step of selecting a backup partner after it is removed from the list, either initially or to replace a reneging backup partner, will be hereafter explained with respect to FIG. 5.

Figure 5:
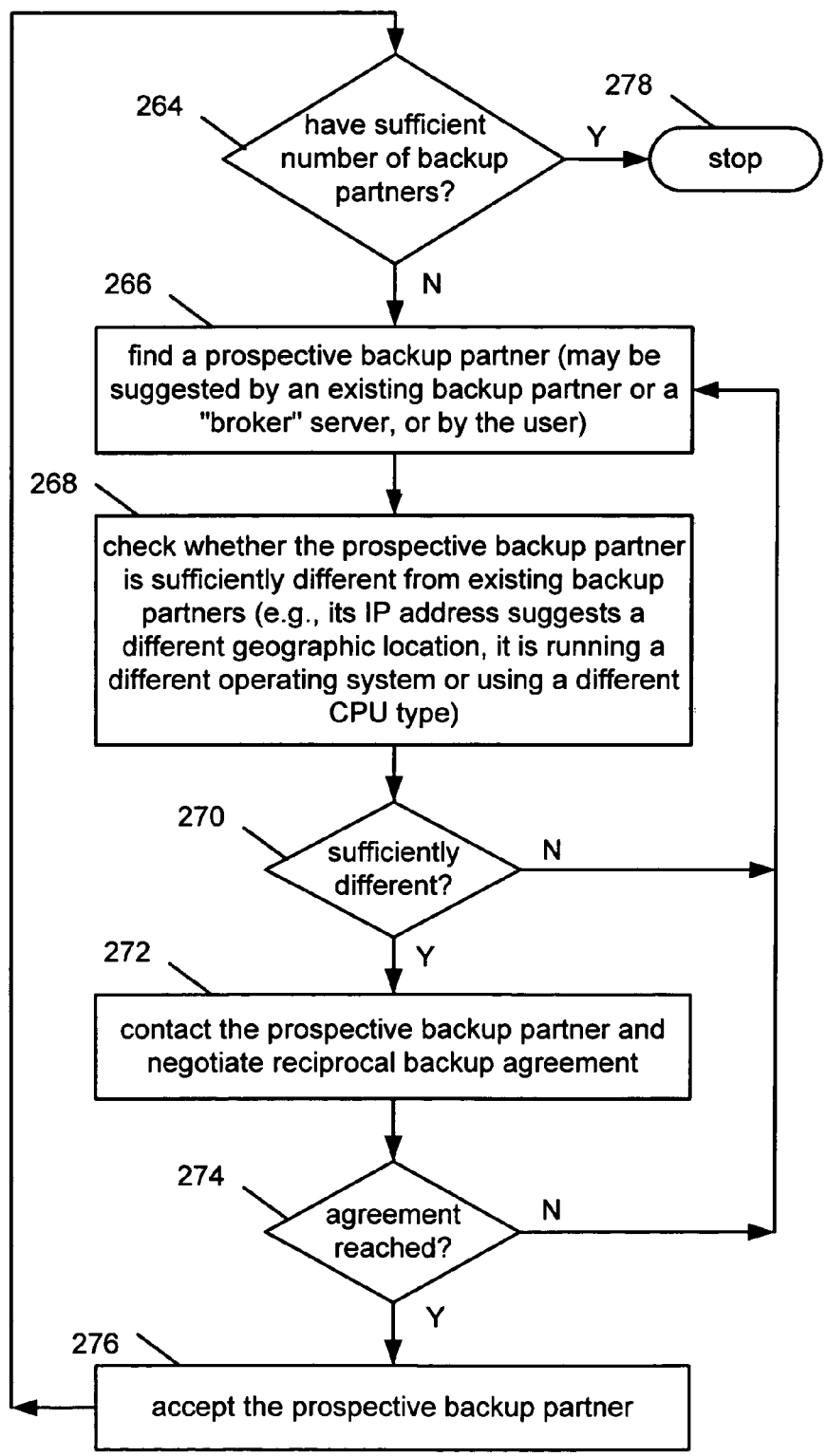
FIG. 5 is a flow diagram illustrating the selection of a new backup partner.

FIG. 5 is a flow diagram illustrating the selection of a new backup partner. As will be later explained in more detail, in order to enhance the reliability of the distributed cooperative backup system, an encoding scheme is used to protect the system from loss of data allowing reconstruction of the original data even in the absence of some data blocks. The encoding scheme employs error correction or, preferably, erasure coding adding redundancy to the data blocks to be backed up. In essence, data to be backed up is divided into data blocks and from these data blocks redundant data blocks are computed. The data blocks and redundant data blocks are distributed among distinct backup partners. The distribution is such that if a number of backup partners are lost, and that number is smaller than or equal to $K(<=k)$, it is still possible to recover any block by using data blocks and redundant data blocks from remaining backup partners. There needs to be a sufficient number of backup partners to provide sufficient storage space and to reduce the probability of data loss. To illustrate, assume two cases, one with two and one with ten backup partners. In the first case the loss of either one but not both of the backup partners can be tolerated. When both of them are lost the data is unrecoverable. In the second case it is assumed that the erasure code can tolerate the loss of any four of the backup partners. Additionally, the probability of a backup partner being unavailable at any given instance is assumed to be p. In the first case, the data is unrecoverable with a probability of $p^2$. In the second case, the data is unrecoverable with a probability of $p^{10}+10*p^9*q+10*9/(2)*p^8*q^2+10*9*8/(2*3)*p^7*q^3+10*9*8*7/(2*3*4)*p^6*q^4+10*9*8*7*6/(2*3*4*5)*p^5*q^5$, where $q=1-p$. When p is very small this second value is much smaller than the first value. For instance, when $p=0.01$ the first value is $10^{-4}$ and the second value is $2.4*10^{-8}$. Thus, it is more likely that the data will be unrecoverable in the first case than in the second case. This is true even though 50% redundant storage is used in the first case as compared to 40% in the second case. It is therefore useful at times to select more, rather than fewer, backup partners in order to adjust the probability in a favorable direction.

Accordingly, if there is a sufficient number of backup partners for the number of blocks to be backed up, selection of a new backup partner is not necessary (step 264). In this case, the selection process stops (step 278). If, on the other hand, there is insufficient number of backup partners in the group for holding all the blocks, the selection process continues to next find a prospective backup partner (step 266). A prospective backup partner can be selected by the computer system itself (the one seeking a backup partner) or it can be suggested by a broker server (as mentioned with reference to FIG. 1). To simplify the discussion, selection only by the computer system is hereafter discussed, although either or both of the computer system and broker server can participate in the selection of backup partners. Whichever mechanism is used for selecting the backup partner, a prospective backup partner is one which satisfies certain criteria (step 268).

One possible criterion is geographic separation. Namely, it is preferred to keep backup partners apart from each other in order to avoid irrevocable loss of data say from a localized destructive event (i.e., power interruption, fire, flood etc.) Each computer system, and hence each backup partner, connected to the network has a network address. For example, computer systems connected to the Internet are each addressed by an IP (Internet protocol) address which generally includes four bytes. For example, if two randomly chosen IP addresses, X and Y, differ in the first of these bytes, there is a high probability (but not complete certainty) that the chosen IP addresses belong to two computer systems that are geographically far apart from each other. Thus, geographic separation can be addressed via selection of potential backup partners, e.g., from different parts of the network (different sub-networks), with significantly different network addresses. Depending on the network type, this can mean selection of potential backup partners located, for example, in separate buildings of a campus or separate facilities of an organization that are geographically dispersed. The Internet, of course, allows selection as a potential backup partner of any computer system anywhere in the world.

A second possible criterion is system diversity, such as operating system diversity. System diversity decreases the susceptibility of the distributed cooperative backup system to assaults such as virus attacks. In particular, a prospective backup partner with a network address that satisfies the geographic separation criteria is contacted by the computer system and requested to report its operating system and machine type. The computer system can then determine whether the potential backup partner is a suitably different system from the computer system and others of its backup partners. The computer system prefers to go forward with the selection of a more diverse group chosen from among the potential backup partners that satisfy the geographic separation criteria.

Thus, if (in step 268) the computer system determines that the potential backup partner satisfies the geographic separation and system diversity criteria (step 270) it can proceed to establishing the reciprocal agreement for cooperative backup with this backup partner (step 272). If, however, the potential backup partner is insufficiently different (step 270), i.e., it does not satisfy the foregoing criteria, the computer system repeats the above-described steps for finding another potential backup partner (i.e., it returns to step 266).

To establish the reciprocal agreement, the computer system "negotiates" with the "chosen" backup partner by exchanging with it some information. In particular, the computer system queries the chosen backup partner about its ability to satisfy additional requirements. These requirements include, for example, a predictable and suitable time schedule for being on-line, matching backup requirements, suitable network bandwidth, and cooperative backup track record. More specifically, backup partners are assumed to adhere to certain time schedules for being on-line. The computer system prefers to partner, i.e., reach a reciprocal agreement, with backup partners that, as compared to its time schedule, keep a similar or otherwise a suitable time schedule for being on-line and for providing backup services. Moreover, the computer system expects the chosen backup partner to maintain its stated on-line time schedule. The computer system further prefers to partner with backup partners to which it is connected via a network (or network portion) having a bandwidth that is at least better than a required threshold bandwidth. Preferably, also, the average bandwidth of such network (or network portion) should be larger than the required threshold bandwidth. In addition, the computer system prefers to partner with backup partners that have matching backup requirements. To this end, the computer system sends a query to the chosen backup partner regarding its backup space requirements and availability of backup space. The chosen backup partner's cooperative backup track record is an additional consideration for the computer system. The computer system prefers to partner with a backup partner that has not reneged on a large number of other computer systems. By exchanging messages, the computer systems can collectively keep track of an estimate of how many times each computer system has reneged on others recently. For this purpose, the number of other computer systems can be predetermined (to be, for example, two other computers systems). In actual fact, any reasonable value of this parameter will be within the scope and spirit of the present invention.

It is noted again that the foregoing operations are from the standpoint of the computer system, and that the same operations are expected to be performed by the chosen backup partner. Thus, it is expected that the chosen backup partner will query the computer system in a similar manner. If both the computer systems and chosen backup partner agree that their requirements can be mutually met, and thus the cooperative backup can be properly performed, the reciprocal agreement between them is made (step 274). If, by contrast, the agreement cannot be reached (step 274) the computer system returns to start looking for another suitable backup partner (at step 266). In the case that an agreement is made, the computer system accepts the chosen backup partner to the group and adds it to the list of its group of backup partners. Clearly, also, the new backup partner accepts the computer system as its new backup partner and adds the computer system to its list of backup partners (step 276). After accepting the new backup partner, the computer system repeats the step of determining whether it has sufficient number of backup partners for its blocks (returning to step 264). If it does, the selection process ends (step 278). If it does not, the computer system proceeds to look for an additional backup partner repeating the steps as explained above.

It is noted that, preferably, each backup partner of the computer system stores a recent list of the backup partners for the computer system. The redundant copies of this list prevent its loss in case the computer system or some of its backup partners lose this list. Additionally, a user of the computer system can obtain an electronic or hard copy (e.g., disk file or printed copy) of: (i) the identities of a significant number of backup partners of the computer system; and (ii) the encryption key under which the backed up data blocks are encrypted. This information can be sufficient for reconstructing the actual data from the backed up data in the event that data is lost. Lost data can be recovered as long as sufficient number of backup partners are available, anywhere in the world.

Figure 6:
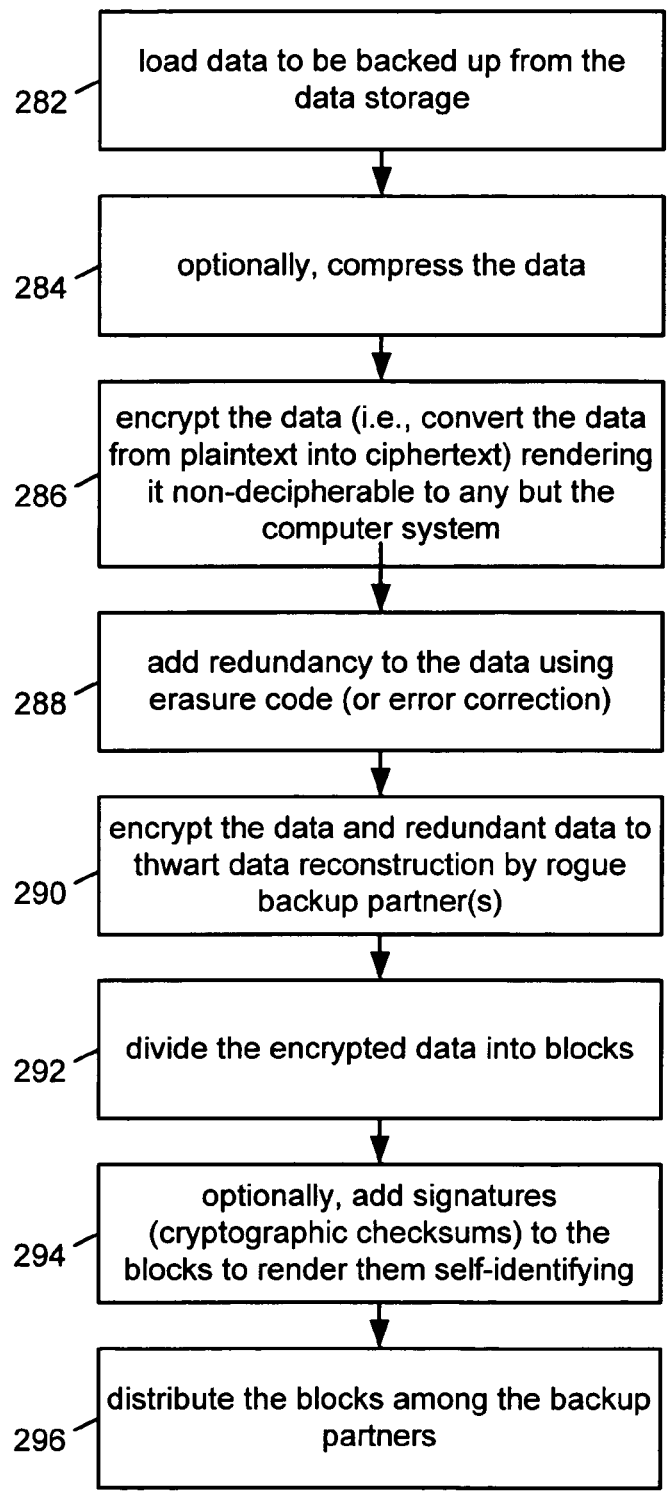
FIG. 6 is a flow diagram illustrating the step of generating and distributing the encoded data.

Accordingly, once, the computer system has partnered with a sufficient number of computer systems on the network, the new or modified group of backup partners is ready to proceed with the cooperative backup operations. As mentioned before with reference to FIG. 3, the computer system generates and distributes encoded data to its backup partners (step 208). FIG. 6 is a flow diagram illustrating the step of generating and distributing the encoded data. First, in step 282, data to be backed up is retrieved from the data storage of the computer system (see, FIG. 2). Next, data compression, preferably lossless data compression, is performed to help reduce storage space and network bandwidth usage (step 284). With the lossless data compression method no data is lost and the space saving can be significant. Although the data compression is beneficial and thus preferred, it is clearly optional and not necessary in the context of the invention.

In order to render the data non-decipherable to any other computer system, the computer system uses cryptography to translate the data (or compressed data) into a secret code known as ciphertext (step 290 and optionally step 286). Also, the computer system encrypts the data to be backed up to prevent a backup partner from being able to use the other backup partners to obtain the back up data it is supposed to be storing (step 290). This would let the backup partner to circumvent the reciprocal agreement, i.e., freeloading. In fact, the computer system can, although it is not required to, encrypt the data to be backed up twice rather than once: (i) to protect the data (step 286); and (ii) to prevent freeloading by a backup partner (step 290). In this case, the second encryption can but need not be as secure as the first.

To implement the data encryption, the computer system employs data encryption algorithms for converting the data from plaintext to ciphertext; and a secret key enables decryption (translation back into plaintext) of the encrypted data. A product cipher known as DES (data encryption standard), for example, is a data encryption algorithm that operates on (e.g., 64-bit) blocks of data using a (e.g., 56-bit) key. Then again, a cipher, known as RC4, accepts keys of arbitrary length, and is essentially a pseudo random number generator with the output of the generator being XORed with the data stream to produce the encrypted data. As another alternative, public-key encryption is an encryption method that uses a pair of public and private keys. The public and private keys are related to each other such that the public key can be used to encrypt data and only the corresponding private key can be used to decrypt (translate to plaintext) the encrypted data. At its present state, public-key encryption, including RSA, is rather slow and is therefore not the preferred method. RSA encryption is an example of public-key encryption method. (Essentially, RSA encryption method (i) takes two large prime numbers, p and q; (ii) finds their product, $n(n=pq)$, where n is called the modulus (ii) chooses a number, e, that is less than n and relatively prime to $(p-1)(q-1)$; and (iv) finds d, the inverse of e mod $((p-1)(q-1))$, such that ed=1 mod $((p-1)(q-1))$. Respectively, e and d are called public and private exponents, where the public key is the pair (n, e) and the private key is d.) As noted before, over time public key encryption may become more efficient and, when it does, it may be preferred because of its superior security characteristics. In any event, the private key is known only to the computer system and, in all likelihood, cannot be computationally obtained by others of the computer systems. It is noted that other encryption methods can be implemented without departing from the scope and spirit of the present invention so long that such algorithms provide strong data security.

In addition to encryption for rendering the data to being backed up non-decipherable the computer system adds redundancy to the data to achieve loss resiliency (step 288). To add the redundancy the computer system uses error correction coding or, better yet, erasure coding (also called loss-resilient encoding or simply encoding). In the case of data encryption being performed once (step 290), the computer system adds the redundancy to the data before the data encryption is performed (and after the compression if compression is used). It is noted that data compression removes redundancy while erasure coding is adding redundancy. Furthermore, to optimize data security the optimal time to encrypt data is when the data contains as little redundancy as possible. Therefore, theoretically, the best time to encrypt the data and render it non-decipherable (step 286) is between the data compression (step 284, if used) and erasure coding (step 288). However, it is imperative that data encryption is done after erasure coding in order to prevent freeloading by backup partners. That is, data encryption after erasure coding is essential in order to prevent a backup partner that failed to retain data entrusted to it from reconstructing this data upon being challenged by retrieving backed up data stored at other backup partners. It is noted that the danger that a cryptography analyst could potentially use redundancy added by erasure coding to break the cryptosystem is outweighed by the strength of present cryptosystems. The security features of present cryptosystems are sufficiently strong to make such occurance a remote possibility. Thus, although the desire for security suggests that data is encrypted twice, one time before and one time after the erasure coding, encryption can be performed only once without significantly compromising the performance of the backup system. But when encryption is performed only once the computer system is supposed to add the redundancy to the data before the data encryption is performed (and after the compression if compression is used; i.e. steps 284, 288 and 290 in order).

In case the computer system does perform the data encryption twice, the computer system is supposed to add the redundancy to the data between these two encryption steps, 286 and 290. That is to say, the computer system sequentially performs in this case the first encryption to protect the data (and this step may be preceded by data compression if it is used), the erasure coding to add redundancy, and the second encryption to prevent freeloading. More on the encoding aspect will be later explained (with reference to FIGS. 6 and 7).

After the data encryption (step 290) the encrypted data is divided into blocks (step 292). Optionally, cryptographic checksums or digital signatures are added to each block to render them self-identifying (step 294). Finally, the blocks are distributed to the backup partners (step 296). Thereafter, the backup partners are expected to hold the, periodically refreshed, backed up data until they are called on by the computer system to provide it, in part or in full. Loss of data is one instance in which the computer system may request the data. Another instance is the periodic monitoring of backup partners as explained above. Upon loss of data the computer system takes steps to restore the lost data by retrieving previously backed up data from its backup partners.

Earlier in the discussion it is mentioned that encoding of data to be backed up by adding redundancy thereto intends to achieve fault-tolerance. That is, protection against data loss is provided by adding redundancy to the actual data. Redundancy can, in fact, be added by replication or encoding. Replication duplicates the data to be backed up say k times to accommodate the loss of k blocks out of m original blocks (producing a total of m×(k+1) blocks). Replication is thus simple but inefficient for large data size as compared to encoding techniques. Encoding includes techniques such as error correction coding and erasure coding. With error correction a storage device failure is manifested by storing and retrieving incorrect values that can only be recognized by embedded coding (i.e., the error location is unknown). Alternatively, the type of errors where the error location is known are usually called erasures. With erasure coding a storage device failure is manifested in lost data and the failed device (location of lost data) is recognized. The following discussion presents a sampling of error correction coding and erasure coding that are currently used as encoding techniques.

By and large, encoding techniques start with the general idea that the data to be stored (or, in this case, to be backed up) comprises the actual data and redundancy, and is often referred to as the data object or code word. The actual data, also referred to as data items or symbols, is fragmented into m blocks and assigned to m storage devices that are referred to as data devices or data sites. The redundancy, also called checks, check symbols or checksum, is fashioned in additional k blocks the content of which is computed from and is of the same type as the actual data (e.g., bits, packets etc.). The additional k blocks are assigned to additional k storage devices that are often referred to as checksum devices or check sites. Hence, the n=m+k blocks are assigned to a total of n=m+k storage devices (e.g., n=m+k servers or, in this case, backup partners with data storage). Moreover, when storage is distributed among n storage devices, fault-tolerance maintains data reliability in the event of failure of some (but no more than k) of the n storage devices. The term "faulty storage device" indicates several possible failures, including: storage device is down, network delay is high, network packets are lost or corrupted, the file to be stored (backed up) is corrupted or destroyed, or only part of the data object is transmitted. In this case, as mentioned before, additional possibilities are a backup partner being off-line or a backup partner reneging. The degree of fault-tolerance determines the number (k) of the faulty storage devices that can be tolerated. Accordingly, fault-tolerance is achieved through encoding, and decoding, techniques that are designed to overcome failure of up to k data storage devices.

For example, erasure coding called "n+1-parity" is often a sufficient encoding technique for fault-tolerance with small values of n. With n+1-parity, one checksum device is sufficient. The i-th byte of the checksum device is calculated to be the bitwise exclusive-or (XOR) of the i-th byte of each of the remaining m storage devices. Alternatively, an error correction coding for tolerating a simultaneous failure of k storage device is an encoding technique called Reed Solomon coding (or RS coding). A detailed description of RS coding can be found in an article entitled "A Tutorial On Reed Solomon Coding For Fault-Tolerance in RAID-Like Systems," by James S. Plank of the Department of Computer Science of the University of Tennessee, available on pages 995-1012 of Software Practice and Experience (SPE), Volume 27, No. 9, September 1997, and which is incorporated herein by reference. The RS coding technique for error correction came to the fore with the development of redundant arrays of inexpensive disks (RAID) and distributed systems (e.g., the aforementioned n storage device) for achieving high-bandwidth and failure recovery. RS coding takes, for example, a set of bits, some of which have been erroneously flipped, and resolves which bits have been flipped.

Error correction coding methods, including the above-mentioned RS coding, correct random errors at unknown locations in a stream of symbols (Actual data). This implies extra redundancy for error location. In the case of the distributed cooperative backup system, however, the location of the faulty backup partners (i.e. inaccessible or in breach of the reciprocal agreement) is known to the computer system. Therefore, the locations of the missing blocks are also known. As noted before, such errors are called erasures. Erasure coding takes advantage of the errors location information to avoid unnecessary consumption of time and space in that it reduces the redundancy required for a given degree of fault-tolerance; and, since the error location is known, erasure coding is easier to implement. For this reason, erasure coding is preferred over error correction coding for achieving the desired backed up data error resiliency. Erasure coding (e.g., Tornado coding, etc.) is a coding technique that takes, for example, a set of bits, some of which are missing or have been erroneously deleted, and a list of the bits that have been deleted, and determines the values of the missing bits. With erasure coding code words represent actual data plus redundancy.

It is noted that as long as the erasure coding (or more generally encoding) allows the recovery of lost data any form of erasure coding can be used without departing from the scope and spirit of the invention. It is important to further point out that in the distributed cooperative backup system the data to be backed up by the computer system comprises a plurality of actual data blocks. That is, the files in the file system are fragmented into say p blocks, each of which being capable of further fragmentation into sub-blocks. The following illustrates an erasure coding approach that facilitates the backing up and retrieving of these blocks, although, clearly, other ways are possible. Each of the p blocks (or sub-blocks) represents a vector of actual data, $U_{1,\ldots,p}$. Moreover, a code word $V=(v_0, v_1, \ldots v_{n-1})$ is produced by multiplying the actual data, $U=(u_0, u_1, \ldots u_{m-1})$, by $G=[g_{ij}]$, an m×n matrix with rows that act as the basis for a vector space containing the code words. That is to say, the code word V, is a vector the elements of which are produced by V=UG. Then, the n=m+k elements of each of the code words, $V_{1,\ldots,p}$, are correspondingly assigned to n=m+k storage devices (i.e., in the backup partners). For example, the i-th backup partner is expected to hold the i-th element of each of the p code words. Namely, each backup partner is assigned to an aggregation of p elements.

At any point in time, one or all of the p elements assigned to each backup partner will be requested by the computer system either for monitoring purposes or upon loss of data. The computer system relies on the backup partners to recover its lost data by retrieving from each of them the elements of the p code words, i.e., the elements of each of the p vectors $V_{1,\ldots,p}$. When less than all n elements $v_0, \ldots, v_{n-1}$ are available for a given code word V, the computer system is nevertheless able to reconstruct the actual data $u_0, \ldots, u_{m-1}$ if it has a sufficient number of elements, say $v'_1, \ldots, v'_l$, where l>=m.

Decoding is the technique by which the computer system reconstructs its actual data from the previously backed up data. In particular, for a given degree of fault-tolerance, e.g., k faulty storage devices (backup partners), the redundancy provided by the encoding allows reconstruction of $U_{1,\ldots,p}$ from $V'_{1,\ldots,p}$ using $G'^{-1}_{1,\ldots,p}$, which is the inverse of $G'_{1,\ldots,p}$, where $G'_{1,\ldots,p}$ is $G_{1,\ldots,p}$ with the columns corresponding to the elements of $V_{1,\ldots,p}$ missing from $V'_{1,\ldots,p}$ deleted (e.g., V'=UG'). Each vector U is reconstructed by $U=V'G'^{-1}$. Several rules apply to the matrix G': (i) for a systematic code (i.e., the code words), the matrix should be systematic; (ii) the rows of the matrix must be linearly independent; and (iii) every m columns of the matrix must be linearly independent so that the matrix G is always invertible. In sum, the reconstructed vectors $U_{1,\ldots,p}$ reconstitute the lost file(s). The foregoing approach is featured, for example, in the previously-mentioned article by M. Quataibah et al., entitled "Coding for High Reliability of a Distributed-Parallel Storage System," which is incorporated herein by reference.

A further sampling of encoding and decoding techniques can be gleaned from U.S. Pat. No. 6,081,909, issued to M. Luby et al. on Jun. 27, 2000, U.S. Pat. No. 6,081,918 issued to D. Spielman et al. on Jun. 27, 2000, and U.S. Pat. No. 6,073, 250 issued to M. Luby et al. on Jun. 6, 2000, all of which are incorporated herein by reference. Respectively, the enumerated patents are entitled: "Irregularly Graphed Encoding Technique"; "Loss Resilient Code With Cascading Series of Redundant Layers"; and "Loss Resilient Decoding Technique."

Figure 7:
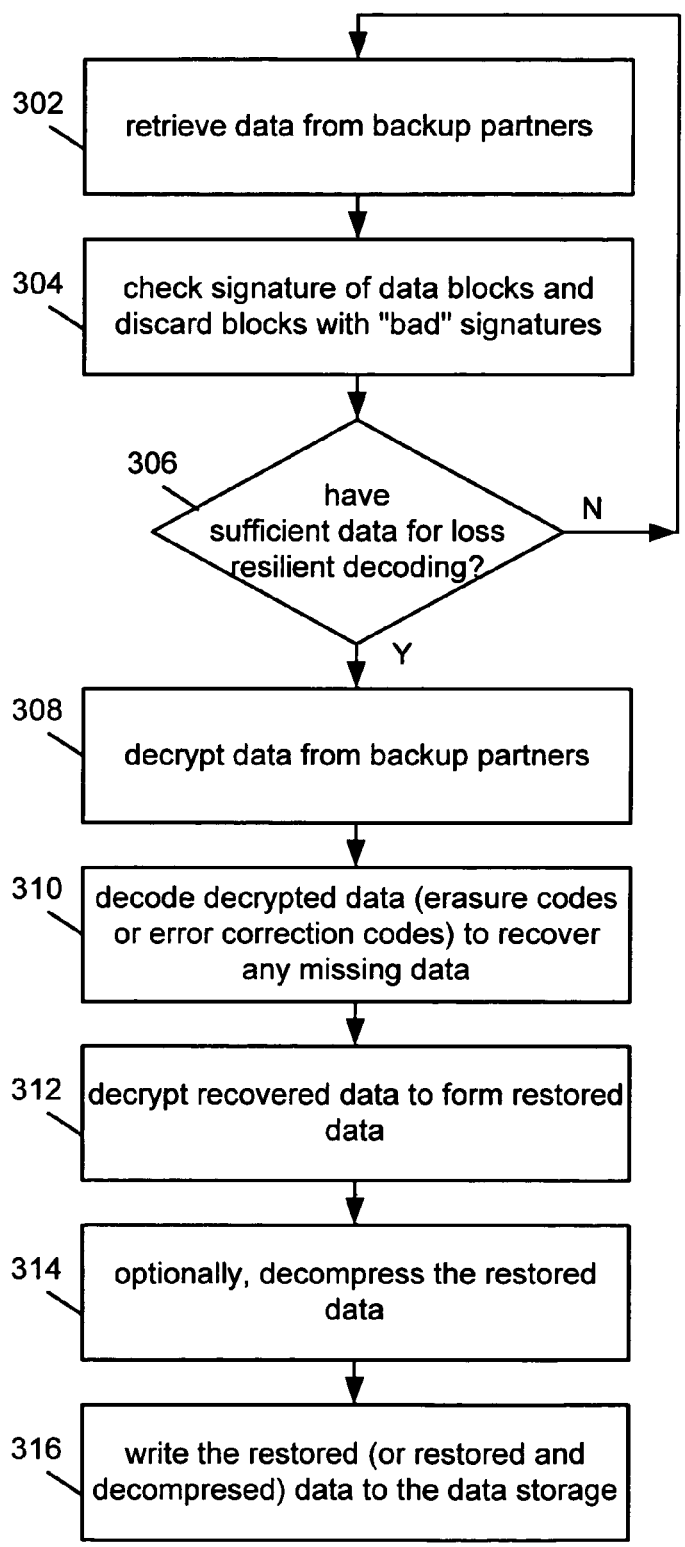
FIG. 7 is a flow diagram illustrating the restoration of data from the backup partners.

In view of the above techniques, FIG. 7 is a flow diagram illustrating the restoration of data from the backup partners. In the event that data is lost, the computer system restores the lost data by first retrieving and next processing the backed up data from its backup partners, one block at a time (step 302). When a block is retrieved, the computer system then checks the digital signature attached to the block (step 304). The computer system uses the private key known only to it to create a digital signature from the data and compares the digital signature it created with the one retrieved with the block (See: FIG. 4 and above discussion on data block validity verification). If the block has a "bad" signature (or hash value), it cannot be relied upon for reconstructing the data. Accordingly, next there is a need to verify next that the number of "good" blocks already retrieved is sufficient to restore the data (step 306). If more bocks are needed, the steps of retrieving and checking the integrity of an additional block are repeated (steps 302, 304 and 306). In fact, these steps are repeated until the number of blocks is satisfactory.

The number of blocks needed for restoring the data is related to the error-correction or erasure coding as explained above. With a sufficient number of blocks for restoring the data, the computer system can proceed to decode the data (step 310). Before that, however, the computer system performs a decryption of the data in the blocks (step 308). This decryption is the inverse of the encryption step 290 in FIG. 6. (It is noted that in the case that the backup system embodies the two-encryption approach, the computer system then proceeds to step 312 to perform a second decryption of the decoded data. If performed, the second decryption is the inverse of the encryption step 286 in FIG. 6. Otherwise, if only one encryption is used this step is inapplicable.) Optionally, if compression is used the computer system also decompresses the compressed data (step 314). Finally, the computer system writes the restored data into its data storage (step 316).

In summary, the present invention provides a distributed cooperative backup system and the method of implementing and operating the same. In accordance with the present invention, a plurality of computer systems cooperate over the network to create a distributed storage space and to provide backup services for each other using the distributed storage space. Notably, the cooperative aspect of the distributed backup is realized by forming over the network backup partnerships among groups of computer systems in the network where backup partners agree to backup each other's data. What is more, the present invention targets self maintenance and effective administration of the backup operations in the absence of central control with the goal of freeing the system from user intervention or any type of system administration. Finally, by automating everything about the backup procedure except installing backup software and performing initial configuration, the present invention advantageously removes substantial obstacles that prevent computer users from otherwise regularly backing up their files.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method for backing up data on a plurality of computers connected via a network, comprising:

forming one or more backup partnerships among the plurality of computers such that each computer in a backup partnership commits under an agreement to store backup data received from one or more backup partners, whereby a first computer in each partnership assumes the task of storing backup data received from one or more other computers in the partnership and one or more of the other computers in the partnership assume the task of storing backup data received from the first computer; backing up data in accordance with each agreement; and periodically verifying that previously backed up data is being retained by the computers committed to act as backup partners in accordance with each agreement.

2. The method of claim 1, further comprising:
selecting potential backup partners from among the plurality computers based on predetermined criteria.

3. The method of claim 1, further comprising:
negotiating the agreements between the plurality of computers based on predetermined requirements, including backup requirements.

4. The method of claim 1, wherein the plurality of computers administer a distributed cooperative backing up of data in the absence of central control.

5. The method of claim 1, wherein each of the plurality of computers has a storage, the storage being periodically scanned to find data to be backed up and identify data previously backed up that no longer needs to be backed up, the data to be backed up being retrieved from the storage for a next periodic backup.

6. The method of claim 1, wherein the verifying that previously backed up data is retained by the backup partners includes monitoring the backup partners, and for any one of the backup partners being monitored,
   selecting a block of data stored at the monitored backup partner,
   requesting the block of data from the monitored backup partner, and
   receiving from the monitored backup partner and checking the block of data to determine if the block of data represents a corresponding block of previously backed up data.

7. The method of claim 6, wherein the block is selected randomly.

8. The method of claim 6, wherein the block is selected using a protocol to produce a number that corresponds to the selected block and that is controlled by at least two backup partners.

9. The method of claim 8, wherein the protocol, being performed by any computer of the plurality of computers, includes
   sending by the computer to a monitored one of its backup partners a has value of a first random number,
   receiving by the computer from the monitored one of its backup partners a second random number,
   sending by the computer to the monitored one of its backup partners the first random number,
   computing the number from the first and second random numbers by both the computer and the monitored one of its backup partners.

10. The method of claim 1, further comprising:
selecting another computer connected via the network to be a new backup partner if it is determined that a backup partner has reneged by not retaining the previously backed up data;
negotiating and, if an agreement is reached, forming a partnership with the other computer, accepting the other computer as the new backup partner.

11. The method of claim 10, wherein selecting another computer to be the new backup partner includes
   determining if there are sufficient backup partners for backing up the data, and
   searching for the other computer based on predetermined criteria including one or both of geographic separation and system diversity.

12. The method of claim 10, wherein if after accepting the other computer as the new backup partner it is determined that the backup partners are insufficient in number for backing up the data, the selecting, negotiating and forming backup partnership with yet another computer are repeated, the determining, selecting, negotiating and forming backup partnership being repeated until the number of backup partners is sufficient.

13. The method of claim 2, wherein selecting computers as potential backup partners includes
   determining if there are sufficient backup partners for backing up the data, and
   searching for computers based on the predetermined criteria that includes one or both of geographic separation and system diversity.

14. The method of claim 3, wherein negotiating the agreements includes, for any computer of the plurality of computers,
   exchanging queries between the computer and computers selected as its potential backup partners about each such computer's ability to satisfy the predetermined requirements that include one or more of
   predictable and suitable time schedule for being on-line,
   suitable network bandwidth,
   matching backup space requirements, and
   backup track record.

15. The method of claim 14, wherein, the computer prefers to partner with those of its potential backup partners that satisfy the predetermined requirements.

16. The method of claim 14, wherein the suitable network bandwidth is equal or larger than a predetermined threshold bandwidth and is characterized by an average bandwidth that is larger than the predetermined threshold bandwidth.

17. The method of claim 14, wherein the backup track record includes not reneging on a number of other backup partners that is greater than a predetermined number.

18. The method of claim 1, wherein each of the backup partners has a recent copy of a list of its backup partners' other backup partners.

19. The method of claim 1, wherein the agreements are respectively negotiated between the plurality of computers such that in each partnership each computer commits to avoid making or honoring a data restoration request for a commitment period that is longer than a grace period, wherein the grace period for a backup partner of a computer starts to run if it is determined that the backup partner has failed to respond to such computer verifying that the backup partner is retaining the previously backed up data or to prove to such computer that it is retaining the previously backed up data, and wherein upon the grace period running out such computer considers the backup partner to have reneged on its agreement.

20. The method of claim 1, wherein the data being backed up is file contents.

21. The method according to claim 1, wherein said forming comprises forming at least two partnerships among the plurality of computers.

22. The method according to claim 1, wherein at least one computer of the plurality assumes the task of storing backup data received from at least two other computers.

23. The method according to claim 1, wherein different portions of data of at least one computer of the plurality are stored by at least two other computers.

24. A distributed cooperative backup system, comprising:
a network; and
a loose confederation of computers connected via the network, a plurality of computers from among the loose confederation of computers being configured for distributed cooperative backing up of data, each computer of the plurality of computers having a storage that can be used for providing reciprocal backup services, and each computer of the plurality of computers respectively having a computer readable medium embodying computer program code configured to cause the computer to form backup partnerships between the plurality of computers, each of the backup partnerships being of computers such that each computer in a partnership commits under an agreement to store backup data received from one or more backup partners, whereby a first computer in each partnership assumes the task of storing backup data received from one or more other computers in the partnership and one or more of the other computers in the partnership assume the task of storing backup data received from the first computer;

back up data in accordance with each agreement; and periodically verify that previously backed up data is being retained by the computers committed to act as backup partners in accordance with each agreement.

25. The system of claim 24, wherein each of the backup partners is allowed to leave the system and return to the system.

26. The system of claim 24, wherein prevention of freeloading is enforced by the backup partners, by any of the backup partners being requested to prove that it is retaining the previously backed up data.

27. A distributed cooperative backup system, comprising:

a network; and a loose confederation of computers connected via the network, a plurality of computers from among the loose confederation of computers being configured for distributed cooperative backing up of data and functioning as backup partners, each computer of the plurality of computers having a storage that can be used for providing reciprocal backup services, and each computer of the plurality of computers respectively having a computer readable medium embodying computer program code configured to cause the computer to select computers as potential backup partners from among the plurality of computers based on predetermined criteria, negotiate a reciprocal backup partnership agreement between the computer and the selected computers based on predetermined requirements, including backup requirements, form partnerships between the computer and selected computers, the computer and the selected computers becoming backup partners by agreeing to cooperatively provide backup services to each other such that a first computer in each partnership assumes the task of storing backup data received from one or more other computers in the partnership and one or more of the other computers in the partnership assume the task of storing backup data received from the first computer and so that a distributed cooperative backing up of data is administered in the absence of central control, periodically back up data at the backup partners, encoding the data each time before the data is backed up, and periodically verify that previously backed up data is retained by the backup partners.

28. A method for backing up data on a plurality of computers connected via a network, comprising:

exchanging messages among computers of the plurality to determine the ability of each to satisfy backup storage requirements of one or more others;

forming a partnership among computers of the plurality in which a first computer in the partnership stores backup data received from one or more other computers in the partnership and one or more of the other computers in the partnership store backup data received from the first computer; and each of the computers in the partnership periodically verifying that its backup data is being retained by one or more of the other computers in the partnership.

29. The method according to claim 28, wherein the verifying includes selecting a block of the previously backed up data wherein the selecting is controlled by at least two of the computers.

30. The method according to claim 28, wherein the partnership consists of two computers.

31. The method according to claim 28, further comprising at least one additional partnership among the plurality of computers.

32. The method according to claim 28, wherein the first computer of the partnership stores backup data received from at least two other computers in the partnership.

33. The method according to claim 28, wherein different portions of data of the first computer of the plurality are stored by at least two other computers in the partnership.

34. Computer readable media having stored thereon computer code for a method of backing up data on a plurality of computers connected via a network, the method comprising steps of:

exchanging messages among computers of the plurality to determine the ability of each to satisfy backup storage requirements of one or more others;

forming a partnership among computers of the plurality in which a first computer in the partnership stores backup data received from one or more other computers in the partnership and one or more of the other computers in the partnership store backup data received from the first computer; and periodically verifying that stored backup data is being retained by one or more of the computers in the partnership.

* * * * *

UNITED STATES PATENT AND TRADEMARK OFFICE
CERTIFICATE OF CORRECTION

PATENT NO. : 7,529,834 B1  
APPLICATION NO. : 09/668643  
DATED : May 5, 2009  
INVENTOR(S) : Andrew David Birrell et al.

Page 1 of 1

It is certified that error appears in the above-identified patent and that said Letters Patent is hereby corrected as shown below:

In column 2, line 12, insert -- the -- before "IEEE".

In column 5, lines 19-20, delete "$13_{1...n}$" and insert -- $14_{1...n}$ --, therefor.

In column 7, line 31, delete "recovers" and insert -- recovery --, therefor.

In column 8, line 62, delete "H0" and insert -- $H()$ --, therefor.

In column 9, line 17, delete "collision in H0" and insert -- collisions in $H()$ --, therefor.

In column 9, line 19, delete "$D_0, D_1 ... D_1 ...$" and insert -- $D_0, D_1 ... D_i ...$ --, therefor.

In column 9, line 35, delete "H0" and insert -- $H()$ --, therefor.

In column 9, line 38, delete "$D+_i$" and insert -- $D'_i$ --, therefor.

In column 9, line 46, delete "H0" and insert -- $H()$ --, therefor.

In column 9, lines 61-62, delete "computer" and insert -- compute --, therefor.

In column 11, line 24, delete "K(<=k)" and insert -- k(<=k) --, therefor.

In column 19, line 45, in Claim 9, delete "has" and insert -- hash --, therefor.

Signed and Sealed this

Twenty-ninth Day of September, 2009

David J. Kappos  
*Director of the United States Patent and Trademark Office*